United States Patent [19]

Ruka et al.

[11] Patent Number: 4,596,750
[45] Date of Patent: Jun. 24, 1986

[54] SUPPORT TUBE FOR HIGH TEMPERATURE SOLID ELECTROLYTE ELECTROCHEMICAL CELL

[75] Inventors: Roswell J. Ruka, Churchill Boro; Barry R. Rossing, Pittsburgh, both of Pa.

[73] Assignee: Westinghouse Electric Corp., Pittsburgh, Pa.

[21] Appl. No.: 712,282

[22] Filed: Mar. 15, 1985

[51] Int. Cl.$^4$ ............................................. H01M 8/12
[52] U.S. Cl. ...................................... 429/16; 429/31; 252/1
[58] Field of Search ...................... 429/30, 31, 32, 33, 429/16, 41; 252/1

[56] References Cited

U.S. PATENT DOCUMENTS

| | | | |
|---|---|---|---|
| 341,728 | 11/1968 | Fullman et al. | 136/86 |
| 3,400,054 | 9/1968 | Ruka et al. | 204/1 |
| 3,436,269 | 4/1969 | Mitoff | 136/86 |
| 3,525,646 | 8/1970 | Tannenberger et al. | 429/31 |
| 4,395,468 | 7/1983 | Isenberg | 429/31 |
| 4,490,444 | 12/1984 | Isenberg | 429/32 |

OTHER PUBLICATIONS

Kotlyer et al, Structure and Electrical Conductivity in the Zirconium Oxide-Yttrium-Oxide-Ferric Oxide and Zirconium Oxide-Yttrium Oxide-Manganes Oxide Systems, Akademiya Nauk SSSR. Ural'skiy Filial, Institur Elektro-Khimii, Trudy, No. 16, pp. 128-134 (1970).

*Primary Examiner*—Donald L. Walton
*Attorney, Agent, or Firm*—R. D. Fuerle

[57] ABSTRACT

Disclosed is a compound having a fluorite-like structure comprising a solid solution having the general formula $[(ZrO_2)_{1-x}(MO_s)_x]_{1-y}[(La_mA_{1-m})_{2-z}(Mn_nB_{1-n})_zO_r]_y$ where $MO_5$ is an oxide selected from the group consisting of calcia, yttria, rare earth oxides, and mixtures thereof, x is about 0.1 to 0.3, y is about 0.005 to about 0.06, z is about 0.1 to about 1.9, A is yttrium, rare earth element, alkaline earth element, or mixture thereof, B is iron, nickel, cobalt, or mixture thereof, m is 0.3 to 1, n is 0.5 to 1, and r is 2 to 4. A porous tube made from such a composition can be coated with an electrically conducting mixed oxide electrode such as lanthanum manganite, and can be used in making high temperature electrochemical cells such as solid electrolyte fuel cells.

18 Claims, 1 Drawing Figure

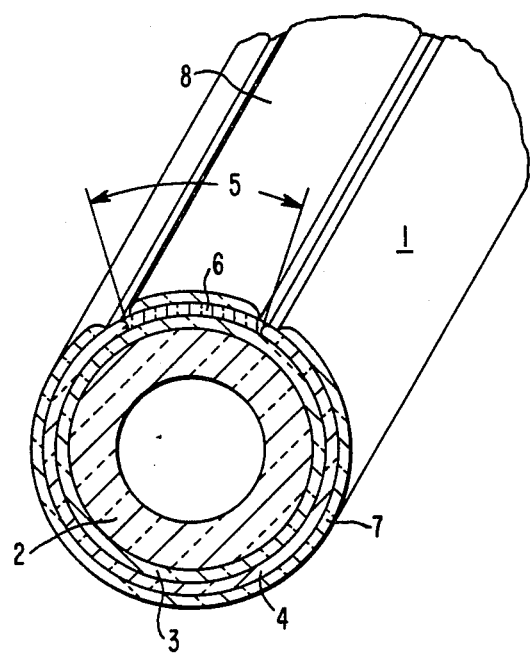

SUPPORT TUBE FOR HIGH TEMPERATURE SOLID ELECTROLYTE ELECTROCHEMICAL CELL

GOVERNMENT CONTRACT

The Government of the United States of America has rights in this invention pursuant to Contract No. DE-AC-0280ET17089 awarded by the U.S. Department of Energy.

BACKGROUND OF THE INVENTION

High temperature solid electrolyte electrochemical cells require intimate contact of the component materials of the cell. In an electrochemical cell described in U.S. Pat. No. 4,395,468, an air electrode is deposited on a support tube, and an electrolyte and electrode are deposited over the air electrode. In that cell, the support tube is made of a porous stabilized zirconia such as $(ZrO_2)_{0.85}(CaO)_{0.15}$, which has a fluorite-like crystal structure, and the air electrode material is a modified lanthanum manganite such as $La_{0.9}Sr_{0.1}MnO_3$, which has a perovskite-like structure.

During the fabrication of the fuel cell, it is necessary to heat the materials to temperatures as high as 1300° to 1400° C. to form and sinter the materials into a solid mass. At these temperatures, and, to a lesser extent at the temperatures at which the fuel cell is operated, the air electrode materials can interact with the materials of the support tube. This is indicated by a discoloration of the materials of the support tube which are adjacent to the air electrode. Sometimes, cracks, delaminations, and other types of damage appear near the interface of the support tube and the air electrode. At least one of the difficulties seems to be due to the interaction that occurs between the support tube and the air electrode.

SUMMARY OF THE INVENTION

We have discovered that structural damage that can occur near the interface of an air electrode and the support tube can be due not only to differences in the coefficient of thermal expansion of the two materials, but also to the diffusion of air electrode materials, such as lanthanum and manganese, from the air electrode into the support tube crystal structure. These migrating elements enlarge the volume occupied by the crystal structure of the support tube materials, and the increased volume can result in cracking and delamination.

We have further discovered that this problem can be solved by including small amounts of these migrating elements in the support tube materials when the support tube is being formed. This reduces the rate of diffusion of these elements from the air electrode into the support tube material and prevents or reduces the expansion of the support tube crystal structure sufficiently to thereby prevent cracking and delamination from occurring. We have also found that support tubes containing lanthanum manganite air electrode material have a substantially greater tensile strength when fired at temperatures greater than 1600° C.

By the simple procedure of including a small amount of manganese, or preferably both manganese and lanthanum, in the support tube material, it is possible to eliminate the extra manufacturing step of placing an intermediate layer in between the air electrode and the porous support tube.

DESCRIPTION OF THE INVENTION

The accompanying drawing is an isometric view in section of a certain presently preferred embodiment of a fuel cell according to this invention.

In the drawing, fuel cell 1 consists of a support tube 2 which provides structural integrity to the cell. Surrounding the periphery of the support tube 2 is a thin layer solid air electrode or cathode 3. This cathode is typically about 50 to 1000 microns (0.05 mm to 1 mm) thick, and is deposited onto the support tube through well-known techniques. Over the periphery of the air electrode 3 is a layer of gas tight solid electrolyte 4, generally comprised of yttria stabilized zirconia about 1 micron to about 100 microns thick. The electrolyte 4 can be deposited onto the air electrode by known high temperature vapor deposition techniques. A selected longitudinal segment 5 is masked during electrolyte deposition and, after demasking, a layer of interconnect material 6 is deposited on the segment. The interconnect material 6 is electrically conductive in both an oxidant and fuel environment. The interconnection 6 is about the same thickness as the electrolyte, about 5 microns to about 100 microns. The preferred interconnection material is lanthanum chromite doped with calcium, strontium, or magnesium. Substantially surrounding the solid electrolyte is a second solid electrode, for example a nickel-zirconia or cobalt-zirconia cermet fuel electrode or anode 7. As shown, the anode 7 is also discontinuous, being spaced from the interconnection 6 at a distance sufficient to avoid direct electrical communication between the anode 7 and the interconnection 6 and the cathode 3. A typical anode 7 is about 100 microns thick. Deposited over the interconnection 6 is a layer 8 which is preferably comprised of the same material as the fuel anode 7 and of about the same thickness. See U.S. Pat. Nos. 4,395,468 and 3,400,054, herein incorporated by reference, for more details.

The support tube of this invention is made from a new composition of matter which combines stabilized zirconia with lanthanum and manganese oxides in the form of a solid solution. Stabilized zirconia materials are ceramic materials which can be obtained in different forms, sometimes as commercial products that consist of zirconia with the crystalline form stabilized by varying amounts of calcia, yttria, or rare earth oxides to provide a stable crystal structure at temperatures of up to 1500° C. or more. A typical stabilized zirconia would have the formula $(ZrO_2)_{1-x}(MO_s)_x$ where $MO_s$ is calcia (CaO), yttria ($YO_{1.5}$), scandia, or rare earth oxides and x is typically about 0.1 to about 0.3. A preferred composition for the stabilized zirconia is $(ZrO_2)_{0.85}(CaO)_{0.15}$, as that composition is thermodynamically stable near 1000° C. and above, and is commercially available and has been found to work well. In the preferred new compositions according to this invention, small amounts of lanthanum manganite or lanthanum and manganese oxides and any other constituents of the lanthanum manganite type air electrode material that will form a solid solution with the stabilized zirconia are added to the stabilized zirconia used to make the support tube.

The empirical formula for the modified support tube material of this invention is described in the formula

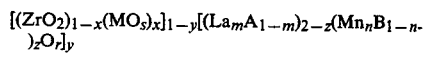

$[(ZrO_2)_{1-x}(MO_s)_x]_{1-y}[(La_mA_{1-m})_{2-z}(Mn_nB_{1-n})_zO_r]_y$ where A is yttrium, other rare earth element, or an alkaline earth element such as calcium or magnesium. In the formula, B is iron, nickel, or cobalt, m is 0.3 to 1, n is 0.5 to 1, y is about 0.005 to about 0.06, and z is about 0.1 to about 1.9, and is preferably about 0.5 to about 1.5, and r is 2 to 4, depending on the valences and relative amounts of A and B. Within the ranges of these compositions, the particular elements and their amounts are selected so that the coefficient of thermal expansion of the support tube matches as nearly as possible the thermal coefficient of expansion of the air electrode.

In less preferred new compositions according to this invention, manganese alone replaces a small amount of the stabilized zirconia that forms the support tube. These compositions can be described by general formula $$[(ZrO_2)_{1-x}(MO_s)_x]_{1-y}[Mn]_y$$

where $MO_s$, x, and y have been previously defined.

The air electrode that is in sintered contact with the support tube is typically a chemically modified lanthanum manganite having the perovskite $ABO_3$ structure. A typical general formula for the air electrode material is $$La_{1-w}(Ca_{1-v}Sr_v)_wMnO_{3\pm a},$$

where w is typically 0.1 to 0.7, v is 0 to 1 and a is a small number, typically less than 0.1 at 1000° C. in air, that depends upon the temperature and oxygen pressure with which it is in contact.

The support tube can be prepared in a number of different ways. A preferred method of preparation is to obtain the stabilized zirconia as a commercial product and to grind it with some of the air electrode material, such as the lanthanum manganite, or with compounds of lanthanum, manganese, and other elements present in the air electrode material in the selected proportions. Suitable compounds include oxides, fluorites, and carbonates, although any compound that will decompose at elevated temperatures to form the metal oxide, such as oxalates, can be used. The ground mixture is pressed and sintered at about 1500° C., then re-ground, pressed, and sintered one or more additional times to produce a homogeneous solid solution. The powder can then be mixed with binders and formed into a tube shape which is sintered to form the tube. Details on the process of forming tubes can be found in U.S. Pat. No. 4,414,337, herein incorporated by reference. Another procedure is to add manganese alone to the stabilized zirconia, instead of using lanthanum manganite. The use of manganese alone, however, is not preferred because if lanthanum is not added to the stabilized zirconium it can also migrate from the air electrode into the support tube and may cause a dimensional change that could damage the support tube. After the support tube has been formed, the air electrode and other components of the fuel cell can be deposited on it in the conventional manner. U.S. Pat. No. 4,395,468 herein incorporated by reference, describes the procedure for forming the remainder of the fuel cell.

It should be noted that the first layer deposited on the support tube may be an intermediate layer, which is deposited before the air electrode. This intermediate layer may be conducting or insulating. The support tube would then contain the migratory elements found in the intermediate layer.

The support tube of this invention can also be used in oxygen gauges, electrolytic cells, and other applications, in addition to electrochemical fuel cells.

The following examples further illustrate this invention.

EXAMPLE 1

Disks ½ inch in diameter and 1 to 2 millimeters thick were made from commercially obtained calcia and yttria stabilized zirconia. Some of the disks were prepared with 5 mole% lanthanum manganite plus 95 mole% of the stabilized zirconia and some of the disks contained no lanthanum manganite. The calcia stabilized zirconia had the formula $(ZrO_2)_{0.85}(CaO)_{0.15}$ and the yttria stabilized zirconia had the formula $(ZrO_2)_{0.9}(Y_2O_3)_{0.1}$. The disks were made by pressing the stabilized zirconia powder into a disk shape and sintering at 1400° C. for one hour. The disks were ground to about 7 to about 10 mils thick.

Powders of $La_2O_3$, $SrCO_3$, and $MnO_2$ were ground together, pressed, and sintered at 1500° C. three times in order to prepare a solid solution of $La_{0.9}Sr_{0.1}MnO_3$. The powdered lanthanum manganite was mixed with water to form a viscous slurry and the slurry was coated onto the disks of stabilized zirconia. The coated disks were fired at 1400° C. for one hour. All of the disks that contained stabilized zirconia and that did not contain lanthanum manganite buckled and cracked, but none of the disks where lanthanum manganite had been mixed with the stabilized zirconia buckled or cracked.

EXAMPLE 2

Four support tubes were made of the compositions:

$$[(ZrO_2)_{0.85}(CaO)_{0.15}]_{0.99}[LaMnO_3]_{0.01}$$

and $$[(ZrO)_{20.85}(CaO)_{0.15}]_{0.95}[LaMnO_3]_{0.05}$$

The compositions for the support tubes were prepared in the a manner similar to Example 1. The support tubes were made by the extrusion method and were fired at about 1600° C. Air electrodes were formed on the support tubes by deposition from a water slurry of finely powdered lanthanum manganite based air electrode material, and were fired at about 1400° C. for ½ to 2 hours.

The support tube-air electrode units that were formed in this way did not crack during fuel cell fabrication.

EXAMPLE 3

One weight percent of lanthanum manganite air electrode material having the formula $La_{0.2}Sr_{0.1}MnO_3$ was added to the precursor materials used to make a yttria stabilized zirconia support tube. The raw tube was sintered at a temperature above 1600° C. It was found to have a substantially greater tensile strength compared to an identical tube not containing the lanthanum manganite air electrode material.

We claim:

1. A compound having a fluorite-like structure comprising a solid solution having the general formula $[(ZrO_2)_{1-x}(MO_s)_x]_{1-y}[(La_mA_{1-m})_{2-z}(Mn_nB_{1-n})_zO_r]_y$ where $MO_s$ is an oxide selected from the group consisting of calcia, yttria, rare earth oxides, and mixtures thereof, x is about 0.1 to about 0.3, y is about 0.005 to about 0.06, z is about 0.1 to about 1.9, A is selected from the group consisting of yttrium, rare earth elements, alkaline earth elements, or mixture thereof, B is selected from the group consisting of Fe, Ni, Co, and mixtures thereof, m is 0.3 to 1, n is 0.5 to 1, and r is 2 to 4.

2. A compound according to claim 1 wherein $MO_s$ is calcia or yttria.

3. A compound according to claim 1 wherein x is about 0.15.

4. A compound according to claim 1 wherein z is about 0.5 to about 1.5.

5. A support tube for an electrochemical cell comprising a tube made from a compound according to claim 1.

6. A support tube according to claim 5 including a ceramic coating on the outside of said tube.

7. A support tube according to claim 6 wherein said coating is electronically conductive and comprises a solid solution having a perovskite-like crystal structure that contains manganese.

8. A support tube according to claim 7 wherein said coating has the general formula $$La_{1-w}(Ca_{1-v}Sr_v)_wMnO_{3\pm a}.$$

where w is about 0.1 to about 0.7, v is 0 to about 1, and a is up to about 0.1.

9. A support tube according to claim 5 closed at one end.

10. A support tube according to claim 5 sintered at a temperature greater than 1600° C.

11. In combination, a solid solution of stabilized, manganese-containing zirconia in sintered contact with an electrically conductive manganese-containing mixed oxide solid solution.

12. A combination according to claim 11 wherein said manganese-containing stabilized zirconia has the general formula $[(ZrO_2)_{1-x}(MO_s)_x]_{1-y}[(La_mA_{1-m})_{2-z}(Mn_nB_{1-n})_zO_r]_y$ where $MO_s$ is an oxide selected from the group consisting of calcia, yttria, rare earth oxides, and mixtures thereof, x is about 0.1 to about 0.3, y is about 0.005 to about 0.06, z is about 0.1 to about 1.9, r is 2 to 4, A is selected from the group yttrium, rare earth elements, alkaline earth elements, or mixtures thereof, B is selected from the group consisting of Fe, Ni, Co, and mixtures thereof, m is 0.3 to 1, n is 0.5 to 1, and r is 2 to 4.

13. A combination according to claim 12 wherein $MO_s$ is calcia or yttria.

14. A combination according to claim 12 wherein x is about 0.15.

15. A combination according to claim 11 wherein said manganese-containing mixed oxide solid solution has the general formula $$La_{1-w}(Ca_{1-v}Sr_v)_wMnO_{3\pm a}$$

where w is about 0.1 to about 0.7, v is 0 to about 1, and a is up to about 0.1.

16. A method of reducing electrochemical cell cracking due to chemical interaction between an oxide ceramic support tube and an oxide ceramic electrode that contains metal ions which can interact with the solid solution of said support tube, comprising adding sufficient amounts of said metal ions, up to the solid solution limit, to the composition from which said support tube is made to reduce the rate of said interaction.

17. A method according to claim 16 wherein said metal ions include lanthanum and manganese.

18. A compound having a fluorite-like structure comprising a solid solution having the general formula $[(ZrO_2)_{1-x}(MO_s)_x]_{1-y}[Mn]_y$ where $MO_s$ is an oxide selected from the group consisting of calcia, yttria, rare earth oxides, and mixtures thereof, x is about 0.1 to about 0.3, and y is about 0.005 to about 0.06.

* * * * *